Figures 1, 2:
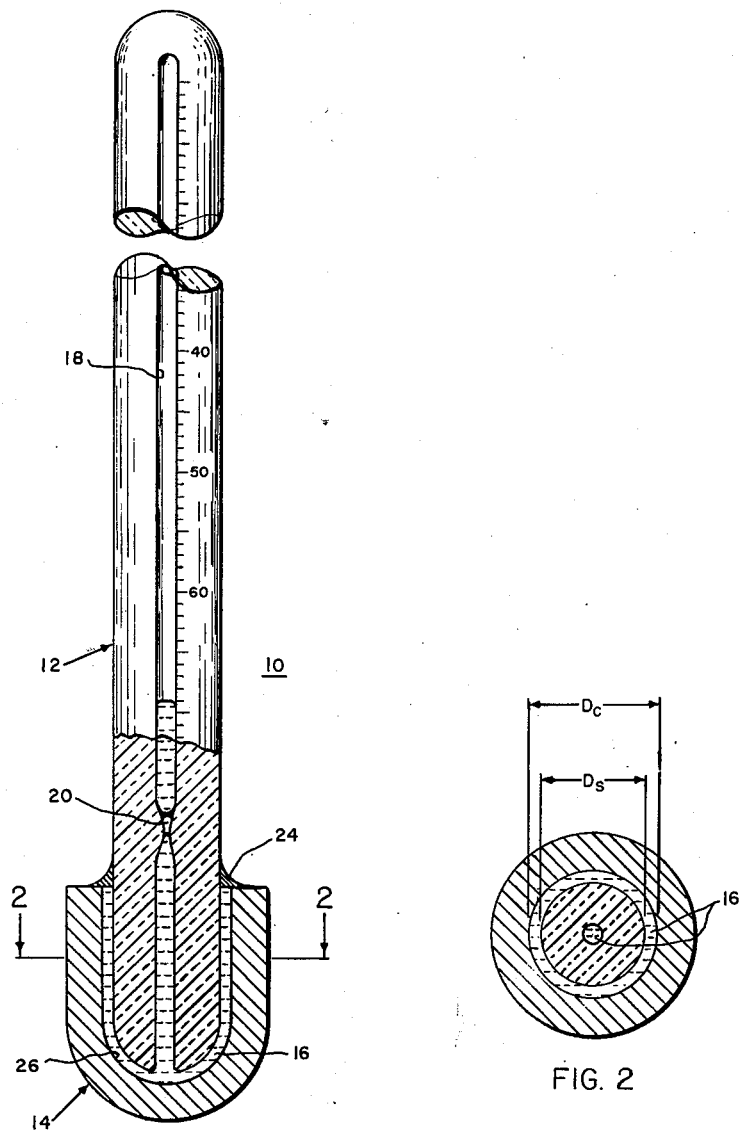

Oct. 21, 1952　　　J. M. BRADY　　　2,614,431
MERCURIAL MINIMUM THERMOMETER
Filed Nov. 5, 1951

INVENTOR,
JAMES M. BRADY.
BY
Harry M. Saragovitz
Attorney

Patented Oct. 21, 1952

2,614,431

UNITED STATES PATENT OFFICE 2,614,431

MERCURIAL MINIMUM THERMOMETER

James M. Brady, West Long Branch, N. J.

Application November 5, 1951, Serial No. 254,968

3 Claims. (Cl. 73—371)

(Granted under the act of March 3, 1883, as amended April 30, 1928; 370 O. G. 757)

The invention described herein may be manufactured and used by or for the Government for governmental purposes, without the payment of any royalty thereon.

This invention relates to minimum thermometers and more particularly to a mercurial type minimum thermometer.

Minimum thermometers provide a record of the lowest temperature occurring at the place of exposure from the initial setting time of the thermometer until the thermometer is read. The conventional minimum thermometer is generally filled with uncolored ethyl alcohol at a temperature of about 0° F. The bore of such a thermometer is usually larger than that of a mercury thermometer to provide sufficient room for the movement of an index. The index is a double-ended piece of dark colored glass, so shaped as to follow the movement of the upper end of the alcohol column as the temperature falls, but to remain at the lowest point as the alcohol flows over it when the temperature rises. Generally the index slides freely up and down within the thermometer bore when one end of the thermometer stem is raised or lowered. However, and especially after the thermometer has been shipped, the alcohol column in the bore may become broken up into short detached segments and the index may be caught and held. To remedy this sometimes proves a difficult operation.

An object of this invention is to overcome the above and related disadvantages.

Another object is to provide a fluid type minimum thermometer that does not require an index.

These and other objects of this invention will become apparent from the following description and claims.

In accordance with this invention there is provided a fluid type minimum thermometer that functions in a manner similar to the conventional type maximum mercurial thermometer. The construction is such that a decrease in temperature at the place of exposure effects an increase in the fluid level within the thermometer bore while an increase in temperature effects a drop in the fluid level within the bore. The bore is provided with a constriction in juxtaposition to the thermometer bulb which prevents return flow of the fluid to the bulb unless the thermometer be agitated. Thus as temperature decreases more fluid is forced past the constriction and thus the minimum temperature attained during the exposure period is recorded.

This inverse flow of fluid is attained through the use of a novel bulb construction. The novel bulb generally consists of a cup-shaped element which encompasses the thermometer stem and is sealed thereto. The cup fits about the stem in a manner as to leave a cup-shaped passageway that is in communication with the open end of the thermometer bore. The outer diameter of the thermometer stem, and the inner diameter of the cup-shaped element are chosen such that (as will hereinafter be disclosed) with a decrease in temperature the volume of the passageway formed between the thermometer stem and the cup-shaped element diminishes faster than the volume of the thermometer fluid within the passageway thereby effecting a rise of the fluid within the bore.

This invention will be more fully understood by reference to the appended drawings wherein:

Fig. 1 shows a minimum thermometer in accordance with an embodiment of this invention, and Fig. 2 is a view through section 2—2 of Fig. 1.

Referring to the drawings, the thermometer is shown to consist of a temperature calibrated stem 12, a cup-shaped bulb element 14, and a fluid 16. The stem 12 has a bore 18 axially therethrough which has a constriction 20 therein (in the same manner as the conventional maximum type mercurial thermometer). Cup-shaped element 14 is sealed to stem 12 by means of a flange 24 to form a passageway 26 bounded by the outer surface of stem 12 and the inner surface of the cup 14. Passageway 26 is in communication with bore 18 as shown.

The outer diameter $D_s$ of stem 12, the inner diameter $D_c$ of cup 14, and the coefficients of cubical expansion or volume expansion of the stem 12 ($e_s$), the cup 14 ($e_c$) and the fluid 16 ($e_f$) are, in accordance herewith, so chosen that the fluid level within bore 18 will fall with an increase in temperature or rise with a decrease in temperature (note the reverse calibration of stem 12). Reverse flow is accomplished if the ratio $$D_s/D_c > (e_c - e_f)/(e_s - e_f)$$

The constriction 20 in bore 18 prevents the reverse flow of fluid 16 with a rise in temperature and therefore the lowest temperature reached during the exposure period is recorded. Obviously the ratio $D_s/D_c$ must be less than one.

In a preferable form the thermometer stem consists of glass ($e_s$ approximately $0.230 \times 10^{-4}$ per ° C.), the cup-shaped element consists of an alloy such as Ni-Span-Hi containing about 29% Ni, 8.5% Cr, 2.4% Ti, 0.4% Mn, 0.4% Si, 0.4% Al, and the remainder Fe ($e_c$ approximately $0.515 \times 10^{-4}$ per ° C.) and the cup is sealed to the stem by a flange consisting of an alloy such as Kovar containing about 54% Fe, 23-30% Ni, 12-30% Cr, and 0.6-0.8% Mn which forms an excellent metal to glass bond. When the lowest temperature to be measured does not exceed $-38°$ F. mercury ($e_f$ approximately $1.819 \times 10^{-4}$ per ° C.) is a preferred fluid. For lower temperatures colored alcohol, pentane, toluol, (freezing point below $-130°$ F.) may be used.

When glass, Ni-Span-Hi, and mercury are used as above denoted to construct the thermometer the ratio of the outer diameter of the stem $D_s$ to the inner diameter of the cup-shaped element $D_c$ should be less than one (1) and greater than 0.823 [in accordance with the formula $$D_s/D_c > (e_c - e_f)/(e_s - e_f)].$$

As many apparently widely different embodiments of the invention may be made without departing from the spirit and scope hereof, it is to be understood that the invention is not limited to its specific embodiment except as defined in the appended claims.

What is claimed is:

1. A fluid filled thermometer comprising a temperature calibrated stem having an axial bore therethrough, said bore having a constriction therein and being open at one end only, and a bulb consisting of a cup-shaped element in juxtaposition to said open end of said bore, the lip of said cup-shaped element being completely sealed to the outer surface of said stem to form a passageway in communication with said bore, said passageway being bounded by the outer surface of said stem and the inner surface of said cup-shaped element, the outer diameter of said stem $D_s$, the inner diameter of said cup-shaped element $D_c$ and the coefficients of cubical expansion of the materials comprising said stem, said cup-shaped element and said fluid, $e_s$, $e_c$, and $e_f$ respectively being such that the ratio $D_s/D_c > (e_c - e_f)/(e_s - e_f)$ and less than one.

2. The thermometer defined by claim 1 wherein the fluid is mercury.

3. The thermometer defined by claim 2 wherein said stem consists of glass, and said cup-shaped element consists of an alloy containing about 29% Ni, 8.5% Cr, 24% Ti, 0.4% Mn, 0.4% Si, 0.4% Al and the remainder Fe.

JAMES M. BRADY.

REFERENCES CITED

The following references are of record in the file of this patent:

UNITED STATES PATENTS

| Number | Name | Date |
|---|---|---|
| 320,119 | Eissner | June 16, 1885 |
| 2,267,556 | Eisele | Dec. 23, 1941 |

FOREIGN PATENTS

| Number | Country | Date |
|---|---|---|
| 257,443 | Switzerland | Oct. 15, 1948 |